Sept. 21, 1965  C. A. RASMUSSEN ETAL  3,206,930
VARIABLE RATIO DRIVE
Filed May 29, 1963  2 Sheets-Sheet 1
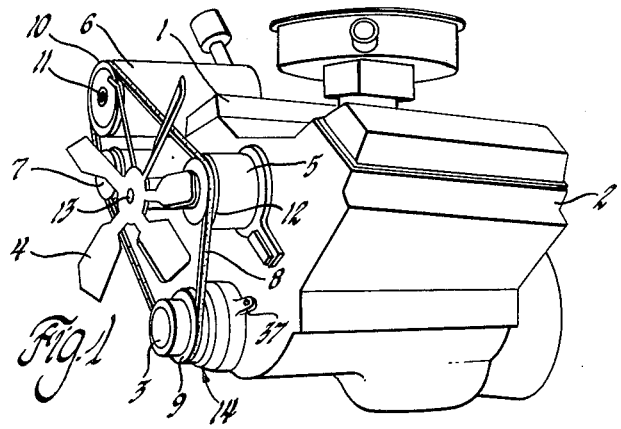
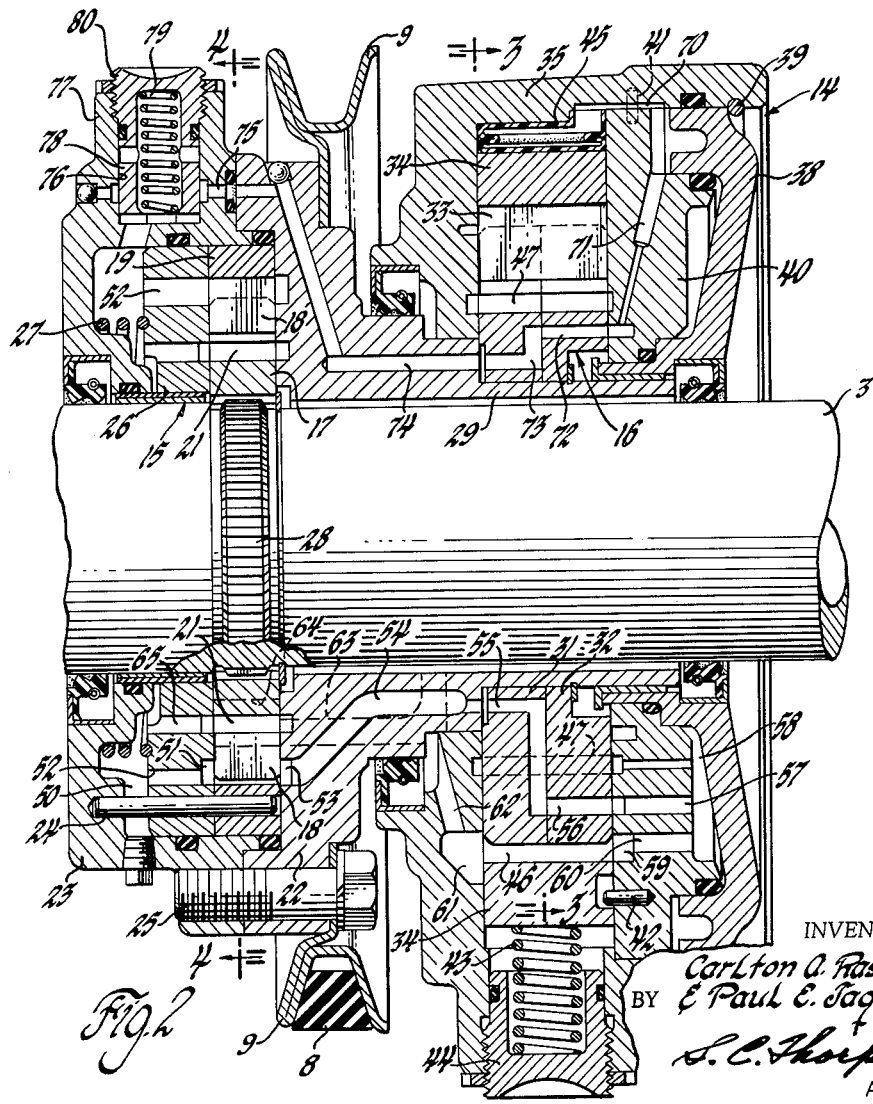
INVENTORS
Carlton A. Rasmussen
BY & Paul E. Jaquish
S. C. Thorpe
ATTORNEY

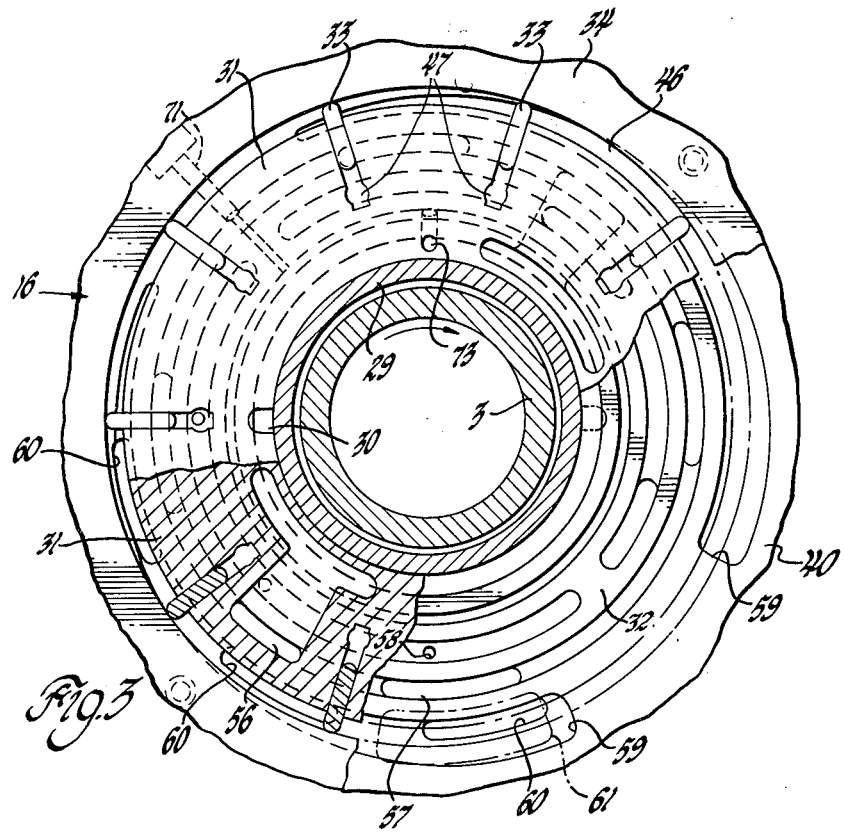
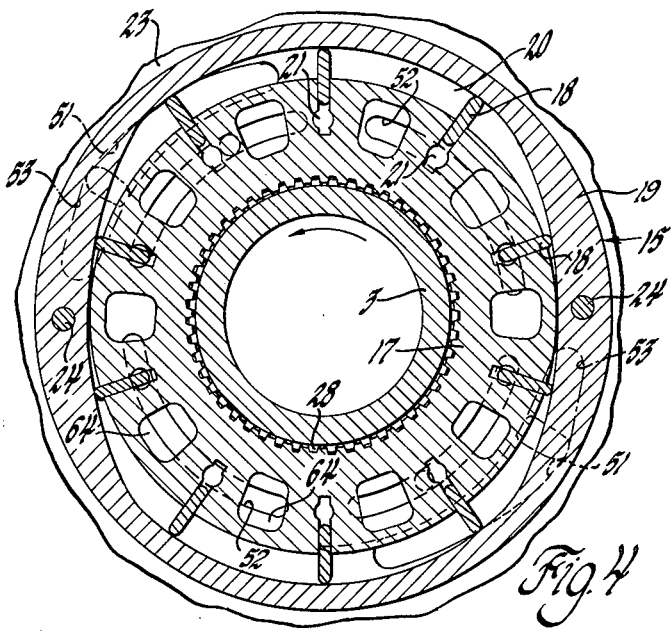

United States Patent Office 3,206,930
Patented Sept. 21, 1965

3,206,930
VARIABLE RATIO DRIVE
Carlton A. Rasmussen, Franklin, Mich., and Paul E. Jaquish, Santa Barbara, Calif., assignors to General Motors Corporation, Detroit, Mich., a corporation of Delaware
Filed May 29, 1963, Ser. No. 284,104
4 Claims. (Cl. 60—53)

This invention relates to variable ratio drives, such as for operating automotive vehicle engine driven accessories at varying speeds over the range of engine operating speed of the engine crankshaft.

It is the conventional practice to drive such engine accessories as the generator, cooling fan and other auxiliaries (power steering pump, air conditioning compressor, etc.) by belts running over pulleys on the engine crankshaft and the shafts of these various accessories, with the result that the speed of each of the accessories is in constant ratio at all times with the crankshaft speed. Since this arrangement has the disadvantage that certain or all of the accessories must be driven faster than necessary at the higher engine speeds in order to obtain a sufficiently high accessory operating speed under low engine speed conditions, various proposals have been made for altering the crankshaft-accessory shaft driving ratio. It is the principal object of our invention to provide a variable ratio drive unit for this purpose which is compact, automatic in operation and unlikely to get out of order since all of its parts are completely enclosed. In its broader aspect, the device comprises a rotary hydraulic pump whose rotor serves as the input member, and the pump casing or other part rotatively reacting to the fluid pressure developed therein is the output member. In fluid series circuit between the pump outlet and inlet is a variable displacement rotary hydraulic motor whose rotor is the movable member thereof and feeds back its torque output to the rotatively driven output member of the pump. The stator of the motor is fixed against rotation but is adjustable to vary the motor displacement under the control of a governor responsive to the speed of said output member.

A preferred illustrative embodiment of the invention is shown in the attached drawings, wherein:

FIGURE 1 is a perspective view of a conventional automotive vehicle engine having a variable ratio drive in accordance with the invention between its crankshaft and accessories.

FIGURE 2 is a longitudinal sectional view through the drive unit as mounted coaxially with the engine crankshaft in accordance with FIGURE 1.

FIGURES 3 and 4 are fragmentary transverse sectional views taken substantially along the lines 3—3 and 4—4, respectively, of FIGURE 2.

The engine illustrated in FIGURE 1 is of conventional V-type having right and left cylinder banks 1 and 2 whose pistons (not shown) are drivingly connected to a common crankshaft 3, from which various accessories, such as the engine cooling fan 4, water pump 5, generator 6 and compressor 7 are driven by means including a variable ratio drive unit and a belt 8 running over pulleys on the crankshaft and shafts of the accessories. The pulley on the crankshaft 3 is shown at 9, and at 10 is shown the pulley on the shaft 11 of the generator. The pulley 12 and its shaft 13 are common to the fan 4 and water pump 5. The variable ratio drive unit is designated generally by the numeral 14, being coaxial with the crankshaft 3 and carrying the crankshaft pulley 9.

As shown in FIGURES 2-4, this drive unit 14 includes a constant displacement rotary hydraulic pump indicated generally by the numeral 15, and a variable displacement rotary hydraulic motor indicated generally by the numeral 16. The pump is of the radially slidable multivane type comprising the rotor 17, vanes 18 (FIGURE 4) and cam ring 19. This cam ring serves as the pump reaction member and cooperates with the rotor and vanes in defining a fluid pumping chamber 20, which is divided by the vanes into a series of chambers circumferentially adjacent each other. The inner periphery of the cam ring is of varying radius and the outer ends of the vanes bear thereagainst during rotation of the rotor, as is conventional in pumps of this type. Passages 21 extend through the rotor adjacent the inner ends of the vanes for urging the vanes outwardly against the cam ring with fluid pressure, in aid of the centrifugal force acting on the vanes during rotor rotation. A two-part pump housing 22, 23 encloses the vaned rotor and cam ring, being fixed against rotation to the latter by pins 24, and is secured together and to the crankshaft pulley 9 by studs 25. Between the rotor and the housing part 23 is a pressure plate 26, and biasing it and the rotor against the other part 22 of the housing is a spring 27. The rotor is splined at 28 to rotate with the crankshaft 3, which thus constitutes the driving means. Rotation is in the direction indicated by the arrows in FIGURES 3 and 4.

The pump housing part 22 has a hub portion 29 with means coupling it, as by keying at 30, to a two-part rotor 31, 32 of the motor 16. This rotor, like that of the pump, carries radially slidable vanes 33 (FIGURE 3), but which operate within a circular cam ring 34. Enclosing these parts of the motor is a motor housing 35 which is suitably fixed against rotation, as by a lug 37 (FIGURE 1) bolted to the engine. This housing is generally C-shape in radial section with its open end facing the engine and closed by a plate 38 suitably retained therein by a snap ring 39. Between the rotor and the plate 38 is a pressure plate 40 which is slidably mounted within inner and outer peripheral portions of the retainer plate 38 and acts as a piston for biasing the two-part rotor 31, 32 against the web of the motor housing 35. Suitable means such as indicated at 41 and 42 serve to key the pressure plate 40 against rotation in the motor housing 35, and the cam ring 34 against rotation relative to the pressure plate, while accommodating radial movement of the cam ring for varying the fluid displacement of the motor.

Operable between the motor housing and its cam ring are provided suitable resilient means in the form of a coil spring 43 for biasing this cam ring to its position shown, concentric with the rotor and crankshaft 3. The compressive force of this spring may be varied by threadedly adjusting its seat 44 in the motor housing. Also operable between the outer wall of the motor housing and its cam ring 34, diametrically opposite the spring 43, are fluid pressure responsive means in the form of an expansible bellows 45 for adjustably moving the cam ring eccentrically of the rotor to increase its fluid displacement. The cam ring of the motor thus cooperates with the vaned rotor 31, 32 in defining a fluid pressure chamber 46 therebetween, or series of circumferentially adjacent chambers between the vanes 33, whose width radially of the rotor is variable circumferentially of the rotor only when the cam ring is in an eccentric position. As in the case of the pump, the radially inner ends of the motor vanes are subjected to fluid pressure for biasing them outwardly against the cam ring, passages 47 being provided in the rotor for this purpose.

Between the pump pressure plate 26 and the pump housing part 23 is a reservoir 50 for the oil or other hydraulic fluid which is circulated through the pump and motor, and which is also used to actuate the bellows 45. The pump inlet is in the form of two diametrically spaced pockets 51 in the rotor side of the pressure plate 26, connected with the reservoir 50 by passages 52 in the pressure plate. Circumferentially spaced from each inlet pocket 51, and on the opposite side of the pump rotor, is the pump outlet in the form of two diametrically spaced pockets 53 in the housing part 22. Passage means, in the form of connecting passages 54, 55, 56 and 57 extending through the housing part 22, motor rotor parts 31, 32 and motor pressure plate 40, respectively, connect these pump inlet pockets 53 with an annular space 58 between the pressure plate 40 and the retaining plate 38 of the motor. Fluid pressure thus delivered to this annular space 58 from the pump during operation serves to bias the motor pressure plate against its rotor and, in turn, bias the rotor against the web of the motor housing 35. The inlet to the motor is in the form of a plurality of circumferentially spaced pockets (only one of which is shown at 59) on the rotor side of the motor pressure plate 38, and these pockets are connected with the annular pressure space 58 by passages 60 through the pressure plate 40. The outlet for fluid leaving the motor is in the form of an equal number of circumferentially spaced pockets in the web of the motor housing 35, only one of which is shown at 61. Other passage means, in the form of a passage 62 in motor housing and a passage 63 in the pump housing part 22, connect the motor outlet pockets 61 with passages 64 (FIGURE 4) through the pump rotor circumferentially intermediate the aforementioned passages 21 in the pump rotor, and these passages 64 connect with passages 65 through the pump pressure plate leading back to the reservoir chamber 50.

Oil or other hydraulic fluid to be used in the unit is thus pumped to the motor and returned by it to the pump in response to relative rotation of the engine crankshaft and the crankshaft pulley 9. When the fluid displacement of the motor 16 is zero, i.e. when its cam ring 34 is in its position shown, concentric with the rotor 21, 32, all reaction from the pump pressure is taken directly by the pump cam ring, and applied by it to the pump housing and crankshaft pulley 9. Under these conditions, the pulley 9 and the engine accessories connected to it by the belt 8 are driven at speeds having a constant ratio to the speed of the crankshaft. To the extent the fluid displacement of the motor is increased by shifting its cam ring 34 eccentrically of its rotor, less of the pump pressure reaction is taken directly by its cam ring 19, and is instead applied against the rotor 31, 32 of the motor in effecting its rotation as the result of pump pressure delivered to the chamber 46 of the motor.

The actuation of the bellows 45 to effect such eccentric positioning of the motor cam ring is accomplished by applying hydraulic fluid pressure from the pump for expanding the bellows 45. Passage means for such fluid pressure application is provided in the form of a pocket 70 in the motor housing wall communicating with the interior of the bellows 45, which pocket connects with passages 71, 72, 73, 74 and 75 provided in the motor pressure plate 40, rotor parts 31, 32 and pump housing parts 22, 23. Between the latter passage 75 and the reservoir chamber 50 is a connecting passage 76 in the form of a bore of a valve body 77 formed integrally of the pump housing part 23. This bore extends radially of the unit, and slidably fitted therein is a centrally apertured valve 78. In this position shown, the valve 78 closes the passage 75 against application of fluid pressure from the reservoir chamber 50 to the bellows 45. Biasing the valve to such closed position is suitable resilient means in the form of a spring 79 seated in a threadedly adjustable plug 80 opposite valve in the valve body 77. By selecting a spring 79 of sufficient stiffness, the valve can be maintained in such closed position against the centrifugal force induced in the valve by its rotation with the pump housing at speeds thereof below a predetermined maximum at which it is desired that the valve should open. Upon such speed being exceeded, the valve will open sufficiently to meter fluid under sufficient pressure to expand the bellows 45 a certain extent, and force the cam ring eccentrically of the rotor axis to the same extent against the spring 43. As the result, fluid flow from the pump via the passages 54, 55, 56, 57, 60, 62, 63, 21 and 64 undergoes pressure drop in passing through the motor chamber 46, and the resulting force acts against the vanes therein to rotatably drive the rotor. Since the motor rotor is keyed to the hub 29 of the pump housing there is a "feedback" of torque from the motor to assist in driving the accessories. In other words, the output torque is split between that imparted to the pump cam ring and housing as the result of reaction to fluid pressure developed in the pump chamber 20 and that imparted to the motor cam ring (and by it to the pump housing) by the fluid pressure drop across the motor chamber 46. The greater the speed of the crankshaft, the greater is the resulting output speed of the crankshaft pulley 9 and the driven speeds of the accessories; however, as the latter speed increases a greater centrifugal force acts on the valve 78, tending to open it further and increase the eccentricity of the motor cam ring. As this eccentricity increases, the fluid displacement of the motor increases, with the result that an increasing share of the input torque from the crankshaft is transmitted to the pump housing and crankshaft pulley via the motor. The motor thus serves to an increasing extent with increased crankshaft speed as a bypass for the pump, and the drive ratio between the crankshaft and the accessory shafts decreases from unity accordingly. By selecting the valve spring 79 and the motor cam ring biasing spring 43 of proper stiffness or deflection rates in relation to the operating speeds and fluid pressures developed, a desired relationship between accessory shaft speed and crankshaft speed can be obtained over the range of engine operating speed.

While only one specific embodiment of the invention has been described and shown for purposes of illustration, it is appreciated that various minor changes in the parts and general arrangement can be made without departing from the spirit and scope of the invention as hereinafter claimed.

We claim:

1. In a variable ratio drive, a rotary pump and a rotary motor, each including a rotor and a reaction member defining a fluid confining chamber therearound, each said chamber having an inlet and an outlet with said pump chamber outlet connected to the motor chamber inlet and the motor chamber outlet connected to the pump chamber inlet, means mechanically coupling the motor rotor to the pump reaction member for concurrent rotation in one direction with the motor rotor, means connected to the pump rotor for rotatively driving the pump rotor in said direction, a quantity of fluid substantially filling said chambers whereby rotation of the pump reaction member is induced in part by its reaction to fluid pressure developed in said pump chamber and in part by reaction of the motor rotor to pump fluid pressure acting thereagainst in said motor chamber, means connected to one of said motor rotor and motor reaction member for varying the fluid displacement of the motor, and means connected to the pump reaction member and movable relative thereto in response to the speed of rotation thereof for controlling said fluid displacement varying means.

2. In a variable ratio drive, a rotary hydraulic pump and a rotary hydraulic motor, each including a rotor and a reaction member defining a fluid confining chamber therearound having an inlet and an outlet, passage means connecting the pump outlet to the motor inlet and the motor outlet to the pump inlet, a quantity of hydraulic fluid substantially filling said chambers and passage means, pump rotor input driving means connected to the pump rotor, said motor rotor and pump reaction member being connected for concurrent output rotation and said motor reaction member being fixed against rotation, whereby torque output resulting from rotatively driving the pump rotor is split between that imparted directly by pump member reaction and that imparted through motor rotor reaction to fluid pressures in their respective chambers, means connected to the motor reaction member for varying the fluid displacement of said motor to thereby vary the ratio of said torque split and thus vary the output-to-input speed ratio, and means connected to the pump reaction member and movable relative thereto in response to the speed of rotation thereof for controlling said fluid displacement varying means.

3. In an automotive vehicle engine having a crankshaft and an engine accessory drive shaft to be driven by the crankshaft at varying speed ratios dependent upon the speed of the crankshaft, means including a variable ratio drive unit drivingly connecting said accessory shaft to the crankshaft, said unit including a constant displacement rotary hydraulic pump having a rotor and a reaction member surrounding and rotatable coaxially of said pump rotor, said pump rotor being connected for rotation by the crankshaft, means connecting said accessory shaft for rotation by said reaction member, a variable displacement rotary hydraulic motor having a rotor coupled to the reaction member and a stator surrounding said motor rotor, fixed means supporting said stator against rotation but accommodating its adjustment radially of the motor rotor between a position concentric therewith and a position substantially eccentric therewith for varying the motor displacement, fluid pressure responsive means operable between said fixed means and stator to adjustably move the stator from its said concentric to its said eccentric position, resilient means operable between said fixed means and stator to bias the stator to its concentric position, said pump and motor each having an inlet and an outlet with the pump outlet connected to the motor inlet and the motor outlet connected to the pump inlet, a passage connecting said fluid pressure responsive means to one of said inlets, a valve movable to open and close said passage, a spring biasing said valve to close the passage, said valve being centrifugally movable in the opening direction against said spring with rotation of said pump reaction member at a predetermined speed.

4. In a variable ratio drive, a constant displacement rotary hydraulic pump and a variable displacement rotary hydraulic motor, each including a rotor carrying radially slidable vanes and a surrounding cam ring operative during relative rotation with the rotor to vary the outward radial extent of the vanes and thereby define fluid pressure chambers of variable width radially of the rotor, each said pump and motor having an inlet for hydraulic fluid to enter between its cam ring and rotor and an outlet for said fluid, a torque output member rotatable with the cam ring of the pump and drivingly connected to the rotor of the motor for rotation therewith in one direction, means for rotatively driving the pump rotor in said direction, a fixed reaction member securing the cam ring of the motor against rotation while accommodating its radial movement for varying the fluid displacement of the motor, respective passage means connecting said outlet of the pump to said inlet of the motor and the motor outlet to the pump inlet, resilient means biasing the motor cam ring radially thereof from said fixed member to a position concentric with the motor rotor wherein rotation of said pump rotor effects a relatively high ratio drive of said output member, fluid pressure responsive means operable to move said motor cam ring against the biasing force of said resilient means to a position eccentric with the motor rotor wherein rotation of said pump rotor effects a lower ratio drive of said output member, a valve body and a valve rotatable with said output member for controlling the operation of said fluid pressure responsive means, said valve body having a passage communicating with said pump inlet and said fluid pressure responsive means and openable and closable by the valve, said valve being movable to open said passage in response to centrifugal force on the valve induced by rotation of said output member, and spring means biasing the valve to its passage closed position but yieldable under centrifugal force on the valve accompanying a predetermined speed of rotation of the output member to effectuate initial opening of said passage and thereby limit the maximum input member speed at which said output member is driven at said high ratio.

References Cited by the Examiner
UNITED STATES PATENTS

| 2,052,429 | 8/36 | Tyler | 192—58 |
| 2,581,172 | 1/52 | Carson | 192—58 |
| 3,027,719 | 4/62 | Keech | 60—53 |

DON A. WAITE, *Primary Examiner.*